United States Patent
Tanaka et al.

(10) Patent No.: US 6,872,376 B2
(45) Date of Patent: Mar. 29, 2005

(54) MODIFIED VANADIUM COMPOUND, PRODUCING METHOD THEREOF, REDOX FLOW BATTERY ELECTROLYTE COMPOSITE AND REDOX FLOW BATTERY ELECTROLYTE PRODUCING METHOD

(75) Inventors: Yasuyuki Tanaka, Tokyo (JP); Muneo Mita, Tokyo (JP); Ken Horikawa, Tokyo (JP); Nobuyuki Tokuda, Osaka (JP); Masayuki Furuya, Osaka (JP); Michiru Kubata, Osaka (JP)

(73) Assignees: Nippon Chemical Industrial Co., Ltd., Tokyo (JP); Kansai Electric Power Co., Inc., Osaka (JP); Sumitomo Electric Industries, Ltd, Osaka (JP)

( * ) Notice: Subject to any disclaimer, the term of this patent is extended or adjusted under 35 U.S.C. 154(b) by 476 days.

(21) Appl. No.: 10/000,127

(22) Filed: Dec. 4, 2001

(65) Prior Publication Data

US 2002/0119090 A1 Aug. 29, 2002

(30) Foreign Application Priority Data

Dec. 26, 2000 (JP) ........................................ 2000-395302

(51) Int. Cl.$^7$ .......................... C01B 17/96; C01G 31/00
(52) U.S. Cl. ...................................... 423/544; 429/105
(58) Field of Search ................... 423/67, 544; 429/105, 429/204, 205

(56) References Cited

U.S. PATENT DOCUMENTS

| | | | | |
|---|---|---|---|---|
| 4,786,567 A | * | 11/1988 | Skyllas-Kazacos et al. ... | 429/19 |
| 5,250,158 A | * | 10/1993 | Kaneko et al. ............. | 205/538 |
| 5,368,762 A | * | 11/1994 | Sato et al. ................. | 252/62.2 |
| 5,587,132 A | * | 12/1996 | Nakajima et al. ............. | 423/62 |
| 6,143,443 A | * | 11/2000 | Kazacos et al. ............. | 429/204 |
| 6,468,688 B2 | * | 10/2002 | Kazacos et al. ............. | 429/101 |
| 6,613,298 B2 | * | 9/2003 | Tanaka et al. ................ | 423/62 |
| 6,652,819 B2 | * | 11/2003 | Shiroto et al. ................ | 423/62 |
| 2003/0017102 A1 | * | 1/2003 | Monaghan et al. ......... | 423/544 |

FOREIGN PATENT DOCUMENTS

| | | | |
|---|---|---|---|
| JP | 60-148068 | | 8/1985 |
| JP | 63-076268 | | 4/1988 |
| JP | 04-149965 | | 5/1992 |
| JP | 04-286871 | | 10/1992 |
| JP | 05-290871 | | 11/1993 |
| JP | 05-303973 | | 11/1993 |
| JP | 06-188005 | | 7/1994 |
| JP | 08/148177 | | 6/1996 |
| JP | 11-011949 | * | 1/1999 |
| JP | 11-067257 | | 3/1999 |

OTHER PUBLICATIONS

Machine Translation of JP 11–011949 (corresponding original foreign document cited above).*

* cited by examiner

*Primary Examiner*—Stanley S. Silverman
*Assistant Examiner*—Ardith E. Hertzog
(74) *Attorney, Agent, or Firm*—Westerman, Hattori, Daniels & Adrian LLP

(57) ABSTRACT

A modified vanadium compound characterized in that vanadium sulfate (III), or a mixed vanadium compound of vanadium sulfate (III) and vanadyl sulfate (IV) contains excessive sulfuric acid other than sulfate group composing the vanadium sulfate (III) or the vanadyl sulfate (IV), and when the modified vanadium compound is used, a redox flow battery electrolyte can be prepared easily.

7 Claims, 4 Drawing Sheets

MODIFIED VANADIUM COMPOUND, PRODUCING METHOD THEREOF, REDOX FLOW BATTERY ELECTROLYTE COMPOSITE AND REDOX FLOW BATTERY ELECTROLYTE PRODUCING METHOD

TECHNICAL FIELD

This invention relates to modified vanadium compound which has excellent solubility with water, particularly excellent solution velocity and whose property is improved so as to be useful as a redox flow battery electrolyte, and relates to a producing method thereof, a redox flow battery electrode composite containing it and a redox flow battery electrolyte producing method.

BACKGROUND ART

Demand for electric power in Japan increases continuously year after year, but a fluctuation in the demand for electric power also tends to become remarkable according to heightening of the industrial structure and an improvement in national living standard. For example, when an amount of the daytime demand for the electric power summer is assumed to be 100, it is not more than 30 at dawn under the present conditions. Namely, the fluctuation in the demand for electric power has a great difference depending on time zones.

Since an electric power is supplied directly from generated power in a power station, if a fluctuation in the demand for electric power is large, the power station cannot help greatly fluctuating its output, this disturbs stable operation in the power station.

Particularly in recent years, a percentage of nuclear plants and new thermal power stations, which difficultly cope with output fluctuation in comparison with hydroelectric power or the like which can easily cope with output fluctuation, tends to increase. For this reason, necessity of facilities, which is capable of storing electric powers so as to cope with fluctuation in the demand for electric power while an output of a nuclear plant or the like is being maintained constant, is heightened. As such an electric power storing facility, a pumping power apparatus is currently used, but since installation of the pumping power apparatus requires a huge site, it is becoming difficult to secure such a site.

From the viewpoint of the above circumstances, various secondary batteries are being studied as a method of storing electric powers as energy which does not cause environmental pollution and has high versatility. Particularly, an attention is paid to a redox flow secondary battery which is constituted so that two kinds of redox agents are brought into contact via a diaphragm.

The redox flow secondary battery is such that an aqueous solution (electrolyte) of metallic ions whose valence changes is stored in a tank and this aqueous solution is supplied to a circulation type electrolytic cell having electrolytic cells so that charging and discharging take place.

As this redox flow battery, there typically suggest batteries using an iron-chromium hydrochloric acid solution as an electrolyte (for example, Japanese Patent Application Laid-Open No. 60-148068 (1985), Japanese Patent Application Laid-Open No. 63-76268(1988)), and batteries using vanadium sulfate solution as an electrolyte (for example, Japanese Patent Application Laid-Open No. 4-286871 (1992), Japanese Patent Application Laid-Open No. 6-188005 (1994)).

However, as for the former batteries, preparation of an electrolyte is restricted from the viewpoint of mixing and solubility, and an output voltage is about 1V, namely, an energy density is low. Further, there arise problems that a charging state between the positive electrode solution and the negative electrode solution becomes imbalanced, that chlorine gas is possibly generated from the positive electrode at the time of charging, and the like. On the contrary, an attention is paid to the latter batteries because its output voltage is 1.4 V, namely, high, and thus this battery has high efficiency and high energy density.

Recently, there suggest some vanadium electrolyte producing methods, and for example, Japanese Patent Application Laid-Open No. 4-149965 (1992), Japanese Patent Application Laid-Open No. 5-290871 (1993), Japanese Patent Application Laid-Open No. 5-303973 (1993) and the like are known. They disclose methods of reacting a pentavalent vanadium compound with a reducing agent by means of electrolytic reduction or under existence of inorganic acid and collecting tetravalent and trivalent vanadium compound solutions so as to producing electrolytes.

In addition, the above-mentioned redox flow battery normally uses an electrolyte containing tetravalent vanadium as a positive electrode solution and an electrolyte containing trivalent vanadium as a negative electrode solution. This redox flow battery is such that the tetravalent vanadium in the positive electrode solution is changed into pentavalent vanadium and the trivalent vanadium in the negative electrode solution is changed into bivalent vanadium at the time of charging. At the time when the electrolytes in the positive electrode and negative electrode tanks become pentavalent and bivalent vanadium respectively, discharging takes place. However, charging and discharging in the electrolytes is balanced as long as a number of moles of the tetravalent vanadium oxidized with the positive electrode solution and a number of moles of the trivalent vanadium reduced by the negative electrode solution are balanced. For this reason, the electrolyte can be prepared without using a solution of only tetravalent vanadium or a solution of only trivalent vanadium. For example, it is known that a mixed vanadium solution, which contains tetravalent vanadium and the trivalent vanadium in the equal amount, is used as the positive electrode solution and the negative electrode solution, or a mixed solution of tetravalent vanadium and trivalent vanadium in 2:1 molar ratio is used as the positive electrode solution and a mixed liquid of tetravalent vanadium and trivalent vanadium in 1:2 molar ratio is used as the negative electrode solution.

Particularly, the mixed solution of the tetravalent and trivalent vanadium in 1:1 molar ratio does not require a balancing operation for the molar ratio and can be used commonly as the positive electrode solution and the negative electrode solution in the original state. For this reason, if the mixed vanadium compound which contains tetravalent and trivalent vanadium in 1:1 molar ratio can be produced easily, industrial utility value is high. As a method of producing a trivalent and tetravalent mixed vanadium compound, there suggest a method of producing a tetravalent and trivalent mixed electrolyte in such a manner that a vanadium compound is dissolved in a solvent under a condition of alkali or neutrality, vanadium ions are heated and polymerized under a condition of acidity so that polyvanadium oxide compound is separated, a part of the polyvanadium oxide compound is calcined in an atmosphere of inert gas or oxidation so that ammonium is removed, at least another part of the polyvanadium oxide compound is processed in an atmosphere of a reducing gas so that a trivalent vanadium compound is generated, pentavalent vanadium from the ammonia removing step is mixed and made to react with one part of the trivalent vanadium solution (Japanese Patent Application Laid-Open No. 08-148177 (1996)), a method of producing a trivalent and tetravalent vanadium electrolyte in such a manner that a reducing operation is performed on a compound containing pentavalent vanadium so that a vanadium compound with valence lower than pentavalent in which a heating peak of reoxidation is not more than 600° C. when this peak is measured by differential thermogravimetric analysis under airflow is generated, and an obtained reductant is mixed with the compound containing pentavalent vanadium so that the mixture is dissolved in a sulfate solution (Japanese Patent Application Laid-Open No. 11-67257(1999)), and the like.

However, since the conventional trivalent vanadium compound has unsatisfactory solubility with sulfuric acid, when the trivalent vanadium is tried to be dissolved with sulfuric acid and a redox flow battery electrolyte is prepared, a dissolving operation should be performed for several hours in a state that the electrolyte is heated to 100° C. For this reason, a special apparatus is required for preparing the electrolyte, and also a lot of trouble and time are required.

Therefore, it is an object of the present invention to provide a modified vanadium compound which can easily prepare a redox flow battery electrolyte, a producing method thereof, a redox flow electrolyte composite containing the modified vanadium compound and a redox flow battery electrolyte producing method.

DISCLOSURE OF THE INVENTION

In view of its past achievement, the present invention is completed based on the following knowledge. Vanadium sulfate (III) or a mixed vanadium compound of vanadium sulfate (III) and vanadyl sulfate (IV) is dissolved in a sulfuric acid solution and the solution is condensed and cooled to be solidified so that a powder-formed sulfuric acid modified vanadium compound can be obtained. The powder-formed sulfuric acid modified vanadium compound which is modified by the sulfuric acid has extremely excellent solubility with water and the modified vanadium compound contains trivalent and tetravalent vanadium components and sulfuric acid component which are necessary for a redox flow battery electrolyte. For this reason, when the modified vanadium compound is dissolved in water so as to be used, a redox flow battery electrolyte can be prepared easily for short time even at room temperature. Here, in the specification, Roman numerals in parenthesis described after names of vanadium compounds show valence.

Namely, the present invention provides a modified vanadium compound comprising vanadium sulfate (III) or a mixed vanadium compound of vanadium sulfate (III) and vanadyl sulfate (IV), characterized by containing excessive sulfuric acid other than sulfate group composing vanadium sulfate (III) or vanadyl sulfate (IV).

In addition, a modified vanadium compound producing method, characterized in that vanadium sulfate (III) or a mixed vanadium compound of vanadium sulfate (III) and vanadyl sulfate (IV) dissolved in a sulfuric acid solution, is condensed, cooled to be solidified.

In addition, a modified vanadium compound producing method, characterized in that vanadium sulfate (III) or a mixed vanadium compound of vanadium sulfate (III) and vanadyl sulfate (IV) is dissolved in a sulfuric acid solution, and an obtained vanadium-contained solution is condensed and is cooled to be solidified.

Further, a redox flow battery electrolyte composite, characterized by containing the modified vanadium compound.

Further, a redox flow battery electrolyte producing method, characterized in that the modified vanadium compound is dissolved in water.

DETAILED DESCRIPTION

Figure 1:
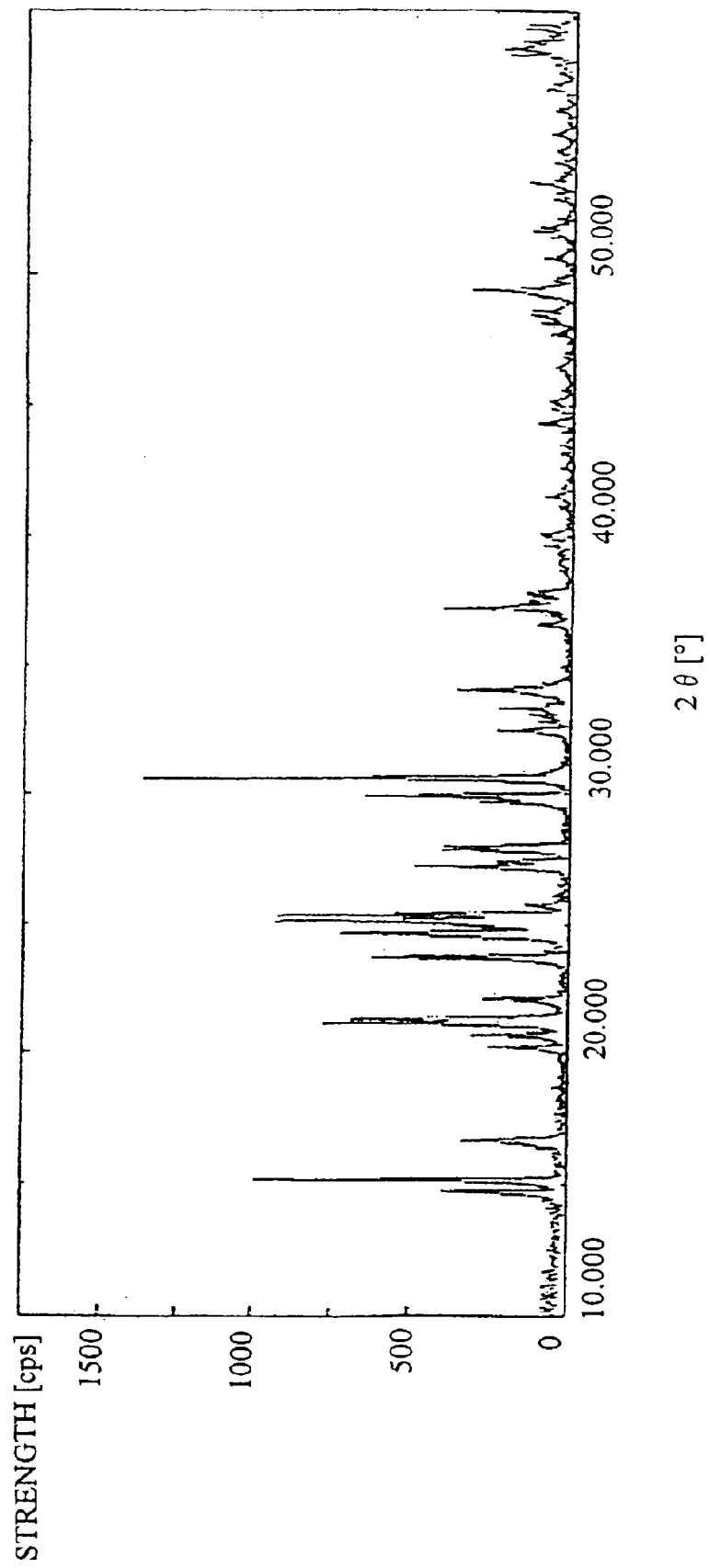
FIG. 1 is an X-ray diffraction pattern of vanadium sulfate (III) obtained in a producing example 1.

There will be detailed below the present invention. A modified vanadium compound of the present invention includes excessive sulfuric acid other than sulfate group composing vanadium sulfate (III) or vanadyl sulfate (IV) in vanadium sulfate (III) or a mixed vanadium compound of vanadium sulfate (III) and vanadyl sulfate (IV). In other words, the modified vanadium compound is obtained by adding sulfuric acid as a modified component into the vanadium sulfate (III) or the mixed vanadium compound of the vanadium sulfate (III) and the vanadyl sulfate (IV).

In the present invention, modified means a state that in vanadium sulfate (III) ($V_2(SO_4)_3$) or a mixed vanadium compound containing vanadium sulfate (III) ($V_2(SO_4)_3$) and vanadyl sulfate (IV) ($VOSO_4$) or water-containing substances of them, excessive sulfuric acid other than sulfate group ($SO_4^{2-}$) composing vanadium sulfate (III) or vanadyl sulfate (IV) exists on surfaces of these compounds, between compounds or in the compounds. In the present invention, the excessive sulfuric acid means $H_2SO_4$.

An amount of the excessive sulfuric acid contained in the modified vanadium compound is not particularly limited. However, when the modified vanadium compound contains sulfuric acid of normally 10 to 30 weight %, preferably 12 to 20 weight %, it is not necessary to newly add sulfuric acid when the modified vanadium compound is used for a redox flow battery electrolyte composite and to adjust density. Therefore, it is desirable.

In addition, if the modified vanadium compound of the present invention contains tetravalent vanadium atoms and trivalent vanadium atoms in molar ratio ($V^{4+}/V^{3+}$) of normally 0.65 to 1.5, preferably 0.95 to 1.05, more preferable equal ratio of $V^{3+}$ and $V^{4+}$, when a redox flow battery electrolyte is prepared, a work to adjust the molar ratio of $V^{3+}$ and $V^{4+}$ is eliminated. Therefore, the modified vanadium compound is desirable because the redox flow battery electrolyte can be prepared easily.

A form of the modified vanadium compound of the present invention is not particularly limited, and a solidified material in which syrup-like substance is solidified at the time of production may be used, or flake-like, pellet-like or particle-like substance may be used. A particle-like substance is preferable because it has a large surface area and a solution velocity with water and sulfuric acid solution. A particle diameter of a particle-like substance is normally not more than 30 mm in average, preferably 0.15 to 5 mm.

The modified vanadium compound of the present invention can be checked by powder X-ray diffraction, chemical analysis or the like and combinations of them, and a composition ratio in the compound can be obtained by ICP emitted light analysis and potential difference titration method. For example, when patterns of the powder X-ray diffraction method is used, those of vanadium sulfate (III) or a mixed vanadium compound of vanadium sulfate (III) and vanadyl sulfate (IV) after and before modification are compared so that modification can be checked according to a difference in the diffraction patterns such as existence or non-existence of peaks, a change or the like in a ratio of height of the peaks. Moreover, amounts of $V^{3+}$ and $V^{4+}$ in the modified vanadium compound powder are obtained by the potential difference titration method, and a whole V amount, a whole $SO_4$ amount and an amount of the other metal in the modified vanadium compound powder are obtained by the ICP emitted light analysis. An $SO_4$ amount contained excessively in the modified vanadium compound can be calculated according to these methods. Further, since color of the vanadium compound is changed according to modification of the present invention, existence and non-existence of modification can be checked according to a change in color. For example, unmodified vanadium sulfate (III) shows lemon-yellow color, and modified vanadium sulfate (III) shows green color. Moreover, a mixture of unmodified vanadium sulfate (III) ($V_2(SO_4)_3$) and vanadyl sulfate (IV) ($VOSO_4$) shows yellow-green color, and the modified mixture shows blue-green color.

Next, there will be explained below a modified vanadium compound producing method of the present invention. A first modified vanadium compound producing method of the present invention is such that a vanadium-contained solution, in which vanadium sulfate (III) or a mixed vanadium compound of vanadium sulfate (III) and vanadyl sulfate (IV) dissolved in sulfuric acid solution, is condensed, and is cooled to be solidified. Moreover, a second modified vanadium compound producing method of the present invention is such that vanadium sulfate (III) or a mixed vanadium compound of vanadium sulfate (III) and vanadyl sulfate (IV) is dissolved in a sulfuric acid solution, and the obtained vanadium-contained solution is condensed, and is cooled to be solidified. Namely, in the second producing method, a step of preparing a vanadium-contained solution is added to the first producing method.

In the second modified vanadium compound producing method of the present invention, vanadium sulfate (III) or a mixed vanadium compound of vanadium sulfate (III) and vanadyl sulfate (IV) which is used as a raw material is not particularly limited, widely known materials can be used.

Such vanadium sulfate (III) or a mixed vanadium compound of vanadium sulfate (III) and vanadyl sulfate (IV) is can be produced in such a manner that a tetravalent or pentavalent vanadium compound, sulfur and concentrated sulfuric acid are kneaded into a past form, and the paste-like mixture is heated to not less than 150° C. through less than 440° C. This method is preferably used because the vanadium sulfate (III) or the mixed vanadium compound of vanadium sulfate (III) and vanadyl sulfate (IV) can be produced directly by using only the tetravalent or pentavalent vanadium compound and a reducing agent. There will be detailed below this method.

<Method of Producing Vanadium Sulfate (III) or a Mixed Vanadium Compound of Vanadium Sulfate (III) and Vanadyl Sulfate (IV)>

At first, a tetravalent or pentavalent vanadium compound (hereinafter, simply referred to as "vanadium compound"), sulfur and concentrated sulfuric acid are kneaded into a paste form. Here, one of the tetravalent vanadium compound or the pentavalent vanadium compound is used, and thus a tetravalent and pentavalent mixed vanadium compound is not used. However, in the case of the tetravalent vanadium compound, if its purity is not less than 95 weight %, preferably not less than 98 weight %, a pentavalent vanadium compound, for example, may be used for the rest part. Moreover, in the case of the pentavalent vanadium compound, if its purity is less than 95 weight %, preferably not less than 98 weight %, a tetravalent vanadium compound, for example, may be used for the rest part.

The tetravalent vanadium compound is not particularly limited, for example, vanadyl sulfate ($VOSO_4$: tetravalent), vanadium dioxide ($VO_2$; tetravalent) and the like are exemplified. Here, vanadium dioxide is changed into vanadyl sulfate (IV) after a calcining step, mentioned later, the vanadium dioxide itself does not exist in the obtained mixed vanadium compound of vanadium sulfate (III) and vanadyl sulfate (IV). The pentavalent vanadium compound is not particularly limited, but vanadium pentoxide ($V_2O_5$: pentavalent), for example, is preferably used because it can be easily obtained industrially. Vanadium pentoxide may be, for example, vanadium pentoxide obtained from vanadium ore, vanadium pentoxide obtained from ash of a dust collector when fossil fuel is burned or the like. Examples of the ash of a dust collector when fossil fuel is burned are heavy oil, tar, asphalt, lime, or fuel obtained by emulsionizing them, and matters obtained when orimulsion or the like is burned. One kind or more kinds of these vanadium compound are combined so as to be used.

Examples of sulfur are powder sulfur, flake sulfur and block-state sulfur, one or more kinds of them are combined to be capable of being used. The sulfur is used for reducing vanadium. As concentrated sulfuric acid, sulfuric acid of not less than 95% which does not contain moisture is normally used. The concentrated sulfuric acid reacts with vanadium so as to generate vanadium sulfate.

In the above producing methods, the blending proportion of vanadium compound, sulfur and concentrated sulfuric acid as raw materials is in the following ranges so that a forming proportion of vanadium sulfate (III) and vanadyl sulfate (IV) can be changed arbitrarily. Namely, the blending proportion is changed so that only vanadium sulfate (III) can be produced or a mixed vanadium compound of vanadium sulfate (III) and vanadyl sulfate (IV) can be produced.

In the case where only vanadium sulfate (III) is produced, if a vanadium compound as a raw material is a tetravalent vanadium compound, as for the blending proportion of vanadium compound, sulfur and concentrated sulfuric acid, the sulfur is not less than 0.25, preferably 0.3 to 0.4, the concentrated sulfuric acid is 1.5 to 2.3, preferably 1.7 to 2 in molar ratio with respect to vanadium atoms in the tetravalent vanadium compound. Moreover, when the vanadium compound as a raw material is a pentavalent vanadium compound, the above blending proportion is such that the sulfur is not less than 0.5, preferably 0.6 to 0.8 and the concentrated sulfuric acid is 1.5 to 2.3, preferbly 1.7 to 2 in molar ratio with respect to vanadium atoms of the pentavalent vanadium compound.

Meanwhile, in the case where a mixed vanadium compound of vanadium sulfate (III) and vanadyl sulfate (IV) is produced, when the vanadium compound as a raw material is a tetravalent vanadium, the blending proportion is such that the sulfur is 0.1 to 0.15 and the concentrated sulfuric acid is 1.2 to 1.9 in the molar ratio with respect to vanadium atoms of the tetravalent vanadium compound. Moreover, when the vanadium compound as a raw material is a pentavalent vanadium compound, the blending proportion is such that the sulfur is 0.35 to 0.4 and the concentrate sulfuric acid is 1.2 to 1.9 in the molar ratio with respect to vanadium atoms of the pentavalent vanadium compound. Further, a forming ratio of vanadium sulfate (III) and vanadyl sulfate (IV) in the mixed vanadium obtained in the above producing method can be changed arbitrarily. For example, in order to heighten the forming ratio of vanadium sulfate (III) in the mixture, the blending proportion of sulfur and concentrated sulfuric acid may be heightened within the range of the molar ratio. When a compound is produced within the above blending proportion, a mixed vanadium in which the molar ratio of $V^{4+}/V^{3+}$ is normally 0.65 to 1.5 can be obtained.

Particularly in the case where the mixed vanadium compound is used as a redox flow battery electrolyte, when the blending proportion of the sulfur and the concentrated sulfuric acid is as follows, this is preferable because about equal amounts of trivalent and tetravalent vanadium compounds can be obtained. Namely, when the vanadium compound as a raw material is the tetravalent vanadium compound, as for the blending proportion, it is preferable that the sulfur is about 0.125 and the concentrated sulfuric acid is about 1.55 in the molar ratio with respect to vanadium atoms in the tetravalent vanadium compound. When the vanadium compound as a raw material is the pentavalent vanadium compound, it is preferable that the sulfur is about 0.375 and the concentrated sulfuric acid is about 1.55 in the molar ratio with respect to vanadium atoms in the pentavalent vanadium compound.

As a method of kneading vanadium compound, sulfur and concentrated sulfuric acid into a paste form, there is, for example, a kneading method using mixers such as a Nauta Mixer(R), a paddle mixer and a kneader mixer. The kneading time is not particularly limited, but for example, 10 to 60 minutes. Here, the paste form represents a state that a knead matter has considerable viscosity, and is a concept containing a block state. In the present invention, the mixture of the vanadium compound, sulfur and concentrated sulfuric acid is made to be into the paste form so that the reaction takes place uniformly.

After the kneading is completed, the paste-form mixture is heated in a calcining oven at not less than 150° C. to less than 440° C., preferably not less than 180° C. to less than 350° C., more preferably not less than 200° C. to less than 300° C. When the calcining temperature is within the above range, it is preferable because the reducing reaction takes place smoothly and a decomposing amount of sulfuric acid is small. The calcining time is 30 minutes to 24 hours, preferably 2 to 5 hours. When the calcining time is within the above range, it is preferable because reducing is executed sufficiently. Examples of the calcining oven are a tunnel kiln, a ring kiln and a rotary kiln. After the completion of the calcining, the calcined matter is cooled and, if desired ground into pieces so that vanadium sulfate (III) ($V_2(SO_4)_3$) or a mixture of vanadium sulfate (III) ($V_2(SO_4)_3$) and vanadyl sulfate (IV) ($VOSO_4$) is obtained.

<Method of Producing Modified Vanadium Compound of the Present Invention>

In a second method of producing the modified vanadium compound of the present invention, at first vanadium sulfate (III) or a mixed vanadium compound of vanadium sulfate (III) and vanadyl sulfate (IV) is dissolved with a sulfuric acid solution so that a vanadium-contained solution is prepared. As for the vanadium-contained solution producing method, the vanadium sulfate (III) or the mixed vanadium compound is dissolved with a sulfate solution. Here, as the vanadium sulfate (III) or the mixed vanadium compound to be used for dissolving, forms of particles with large surface area, flake and the like are preferable.

The sulfate solution to be used for dissolving the vanadium compound may contain at least sulfate group and water, and if necessary, may contain one or more kinds of another components such as nitrate, such as Na, K, Rb or ammonium, phosphate, oxalate. The density of the sulfate group in the sulfate solution is not particularly limited and can be set arbitrarily. In the case where the obtained modified vanadium compound is used as a redox flow battery electrolyte composite, the sulfate solution is prepared so that density of sulfate ion becomes normally 4 to 8 mol/l, preferably 4 to 5 mol/l.

A temperature when the vanadium sulfate (III) or the vanadium sulfate (III) and the vanadyl sulfate (IV) is/are dissolved with the sulfate solution is not particularly limited. However, since when the temperature is low, the dissolving require a lot of time, it is preferable the dissolving is executed at normally 60 to 100° C., preferably 80 to 100° C., for normally not less than 0.5 hour, preferably 1.5 to 3 hours while agitating.

In the first and second methods of producing the modified vanadium compound of the present invention, a method of condensing the vanadium-contained solution, is not particularly limited as long as water is removed from the solution and a dissolved component can be condensed. However, it is preferable that the dissolved component is heated under reduced pressure and is condensed. A temperature of the condensing operation may be set to a temperature which enables removal of the water in the solution and condensing of the dissolved component. The temperature is normally 60 to 110° C., preferably 80 to 100° C.

The completion of the condensing operation depends on a reduction amount of a weight of a reaction solution due to evaporation of water, and in this case, it is preferable that the condensing operation is performed until a reducing amount of the weight of the reaction solution before condensing operation becomes 36 to 60 weight %.

After the completion of the condensing operation, the condensed solution is cooled to room temperature and solidified, for example, the solution is allowed to stand to be cooled and solidified, thereby obtaining a solidified matter of the modified vanadium compound of the present invention. The solidified matter is a collective of particles, and since excessive sulfuric acid exists on a surface of the particles between the particles or in the particles, even if the particle diameter is not adjusted, the solidified matter itself is dissolved with water or a sulfuric acid solution more easily than vanadium sulfate (III) or a mixed vanadium compound of vanadium sulfate (III) and vanadyl sulfate (IV) without modification. Moreover, the solidified matter may be ground or dried. Particularly it is preferable that the solidified matter is ground because it is easily dissolved with water. Degree of grinding is not particularly limited, but it is preferable that the solidified matter is ground into fine particles because its speed of dissolving with water is heightened. Further, it is preferable that the solidified matters or the particles are dried because a moisture amount of these surfaces is reduced, and the solidified matter or particles hardly adhere to each other or to wall surfaces or the like of bags or apparatuses so that handling becomes easy.

The modified vanadium compound of the present invention has excellent solubility with water or a sulfuric acid solution, and uses sulfuric acid as a modifying agent of solubility with water which is necessary for a redox flow battery electrolyte. As a result, since it is not necessary to add sulfuric acid at the time of preparing an electrolyte, it can be used suitably as a redox flow battery electrolyte composite.

The redox flow battery electrolyte composite of the present invention contains the modified vanadium compound of the present invention. The redox flow battery electrolyte composite of the present invention can be produced by dissolving the modified vanadium compound in water. As for blending amount of the modified vanadium compound in the redox flow battery electrolyte composite, for example, density of vanadium ion is normally 1 to 5 mol/l, preferably 1 to 2 mol/l, density of sulfate ion is normally 3 to 6 mol/l, preferably 4 to 5 mol/l. At this time, one or more kinds of modified vanadium compounds may be used so that the densities falls within the above range, or unmodified vanadyl sulfate (IV) or sulfuric acid is added so that the densities are adjusted. Since the vanadyl sulfate (IV) easily dissolve in a sulfuric acid solution, even if vanadyl sulfate (IV) which is not modified by sulfuric acid is used for adjusting the density of vanadium ion in the electrolyte composite, time required for preparing the electrolyte composite is not lengthen.

The temperature of water to be used for dissolving the modified vanadium compound is not particularly limited, but the temperature may be selected suitably taking an apparatus or the like into consideration because when the temperature is 25° C., the solution time is within 20 minutes, when 40° C., the time is within 10 minutes, and when 60° C., the time is within 5 minutes.

Here, one kind or more kinds of nitrate such as potassium, rubidium and ammonium, phosphate, oxalate and the like can be added to the above vanadium electrolyte.

A redox flow battery which uses the redox flow battery electrolyte composite of the present is a well-known battery, and this battery uses an electrolytic cell having a structure that a positive electrode solution and a negative electrode solution contact via a diaphragm. The positive electrode solution and the negative electrode solution are obtained in such a manner that two kinds of metal ion solutions whose valence changes (electrolytes) are prepared. As to this battery, the valence of metal ion of the positive electrode solution becomes high at the time of charging and the valence of metal ion of the negative electrode solution becomes low. At the time of discharging, the valence of the metal ion of the positive electrode solution becomes low, and the valence of the metal ion of the negative electrode solution becomes high.

In the case where the modified vanadium compound of the present invention contains only vanadium sulfate (III) as the vanadium compound, the modified vanadium compound is dissolved in water so that the blending amount falls within the above range, and a negative electrode electrolyte containing trivalent vanadium ion and sulfate ion can be obtained. Moreover, in the case where the modified vanadium compound of the present invention contains only vanadium sulfate (III) as the vanadium compound, the modified vanadium compound and a pentavalent vanadium compound are dissolved in water so that the density of the vanadium ion and the density of the sulfate ion fall within the above ranges. Thereafter, these compounds are agitated at a temperature of normally about 60° C. and are subject to redox reaction so that a tetravalent vanadium compound is obtained, thereby obtaining a positive electrode electrolyte of the redox flow battery electrode. Meanwhile, the modified vanadium compound of the present invention containing vanadium sulfate (III) and vanadyl sulfate (IV) is dissolved in water so that the density of vanadium ion and the density of sulfate ion fall within the above range, and as a result it can be used simultaneously as the positive electrode solution and the negative electrode solution. Particularly ratios vanadium sulfate (III) and vanadyl sulfate (IV) are contained in more equal mol, a difference in the density of ion connected in charging/discharging between the positive electrode solution and the negative electrode solution is eliminated. For this reason, this state is preferable from the viewpoint of the efficiency of charging/discharging.

(Embodiments)

There will be detailed below the present invention in the embodiments, but the present invention is not limited to them.

Quality levels or the like of $V_2(SO_4)_3$, $VOSO_4$ and their substances modified by sulfuric acid were calculated as follows.

(Quality Level Measuring Method)

Weight ratios of V, all $SO_4$, Fe, Ni and Mg were calculated by the ICP emitted-light analysis method.

Moreover, an amount of $H_2O$ in the modified substance was calculated by subtracting an amount of evaporated $H_2O$ from an amount of $H_2O$ added at the time of modifying process.

(Method of Measuring Valence of Vanadium Compound and an Existence Ratio Per Valence Number)

An amount of whole V and an amount of $V^{3+}$ were measured and an amount of $V^{3+}$ was subtracted from an amount of whole V so that an amount of $V^{4+}$ was obtained, and a weight ratio of $V_2(SO_4)$ and $VOSO_4$ in the compound was calculated based on the existence ratio and the quality levels of $V^{3+}$ and $V^{4+}$ by the potential difference titrate method.

(Method of Calculating Excessive Sulfuric Acid)

The weight ratio of $V_2(SO_4)_3$ and $VOSO_4$ was subtracted from the weight ratio of whole $SO_4$ and a weight ratio of excessively contained $SO_4$ was calculated, and this weight ratio is converted into $H_2SO_4$ so that excessive sulfuric acid was calculated.

PRODUCTION EXAMPLE 1

Vanadium pentoxide ($V_2O_5$) obtained from orimulsion ash of 19.4 g, sulfur of 4.2 g and concentrated sulfuric acid of 39 g were mixed for about 10 minutes into a paste form. The paste-formed mixture was calcined in an electric oven at 300° C. for 2 hours. The calcined matter after cooling (sample A) showed lemon-yellow color and its weight was 41.5 g. When the sample A was subject to the X-ray diffraction, vanadium sulfate (III) ($V_2(SO_4)_3$) was confirmed. Quality levels of the sample A are shown in Table 1, and the X-ray diffraction pattern is shown in FIG. 1.

TABLE 1

| Name of Sample | | V | Whole $SO_4$ | $H_2O$ | Fe | Ni | Mg |
| --- | --- | --- | --- | --- | --- | --- | --- |
| Production Example 1 | A | 25.7 | 72.3 | — | 0.7 | 0.2 | 0.1 |
| Embodiment 1 | B | 14.3 | 53.9 | 31.7 | 0.4 | 0.1 | 0.05 |
| Production Example 2 | C | 28.4 | 67.5 | — | 0.002 | ND | ND |
| Embodiment 2 | D | 13.4 | 52.1 | 34.4 | 0.001 | ND | ND |
| Embodiment 3 | E | 13.1 | 49.2 | 37.6 | 0.001 | ND | ND |
| Embodiment 4 | F | 13.1 | 51.0 | 35.8 | 0.001 | ND | ND |
| Comparative Example 1 | G | 25.9 | 69.3 | — | 0.7 | 0.2 | 0.1 |
| Comparative Example 2 | H | 28.3 | 67.8 | — | 0.002 | ND | ND |

* The unit in the Table is "weight %".

Embodiment 1

Figure 2:
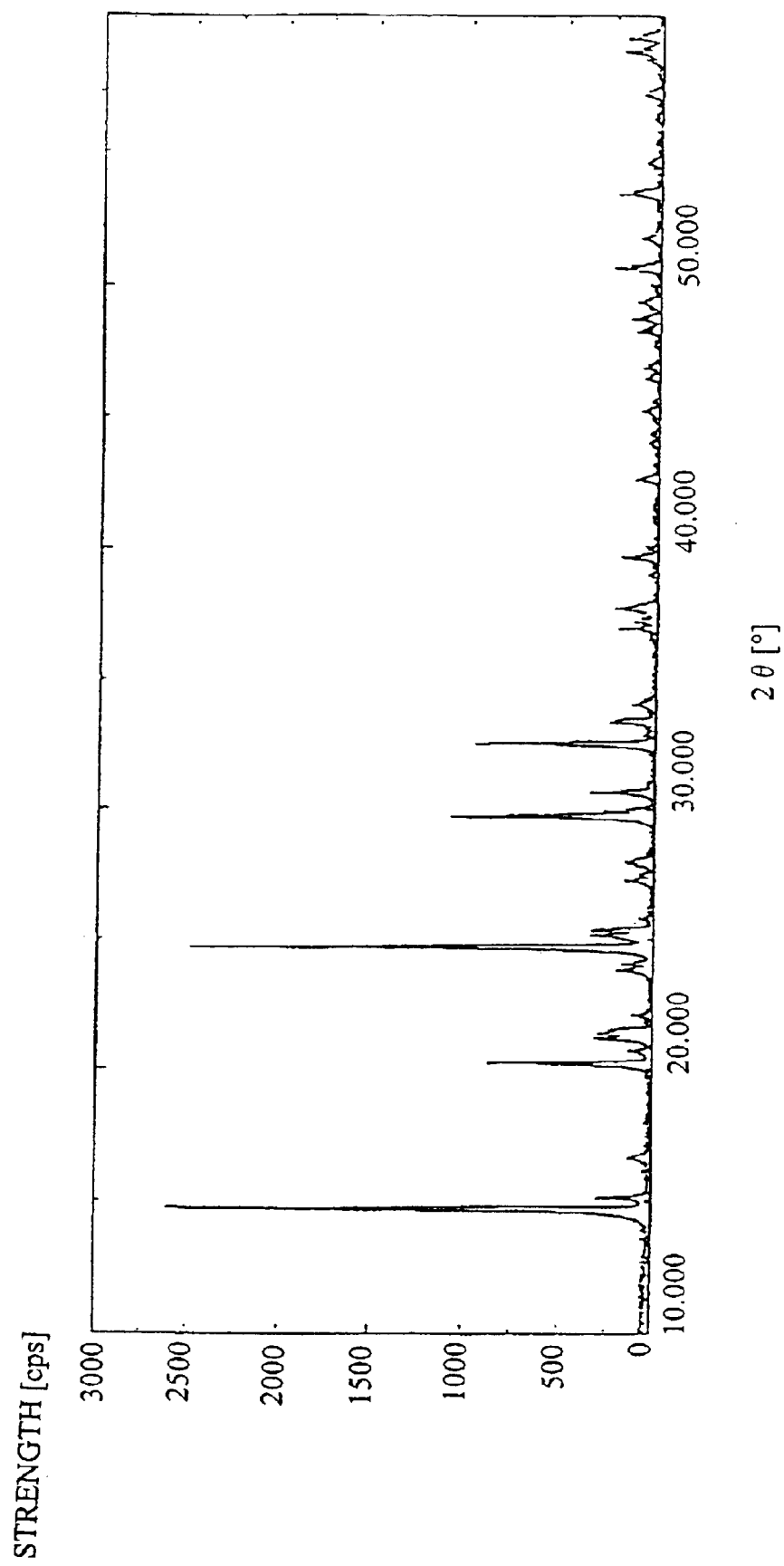
FIG. 2 is an X-ray diffraction pattern of a modified vanadium compound obtained in an embodiment 1.

Concentrated sulfuric acid of 10 g and water of 60 ml were added to the sample A obtained in the production example 1 (vanadium sulfate (III): $V_2(SO_4)_3$) of 41.5 g, and they were thermally dissolved at 100° C. for 3 hours to be concentrated, were cooled to room temperature, and were solidified and ground so that a modified vanadium compound (sample B) containing hydrate of vanadium sulfate $V_2(SO_4)_3$ was obtained. The sample B had a green color and its weight was 71.2 g. The quality levels of the sample B are shown in Table 2, and the X-ray diffraction pattern is shown in FIG. 2. Moreover, an amount of excessive $SO_4$ other than sulfate group composing $V_2(SO_4)_3$ was calculated from the quality levels. The results are shown in Table 2.

The sample B of 35 g (particle diameter: 1 mm) was added to water of 50 ml with various temperature, and time required for dissolving was measured. The results are shown in Table 3.

TABLE 2

| Name of Sample | | Excessive $SO_4$ |
|---|---|---|
| Production Example 1 | A | 0.0 |
| Embodiment 1 | B | 13.5 |
| Production Example 2 | C | 0.0 |
| Embodiment 2 | D | 20.6 |
| Embodiment 3 | E | 12.2 |
| Embodiment 4 | F | 20.2 |
| Comparative Example 1 | G | 0.0 |
| Comparative Example 2 | H | 0.0 |

* The unit in the Table is "weight %"

TABLE 3

| | Temperature (° C.) | 25 | 40 | 50 | 60 |
|---|---|---|---|---|---|
| Embodiment 1 | Solution Time (min.) | 10 | 5 | 3 | 2 |
| Embodiment 2 | | 12 | 6 | 3 | 2 |
| Embodiment 3 | | 11 | 5 | 3 | 2 |
| Embodiment 4 | | 10 | 5 | 3 | 2 |
| Comparative Example 1 | | 25920 | 1440 | 180 | 120 |
| Comparative Example 2 | | 21600 | 1440 | 180 | 120 |

PRODUCTION EXAMPLE 2

Figure 3:
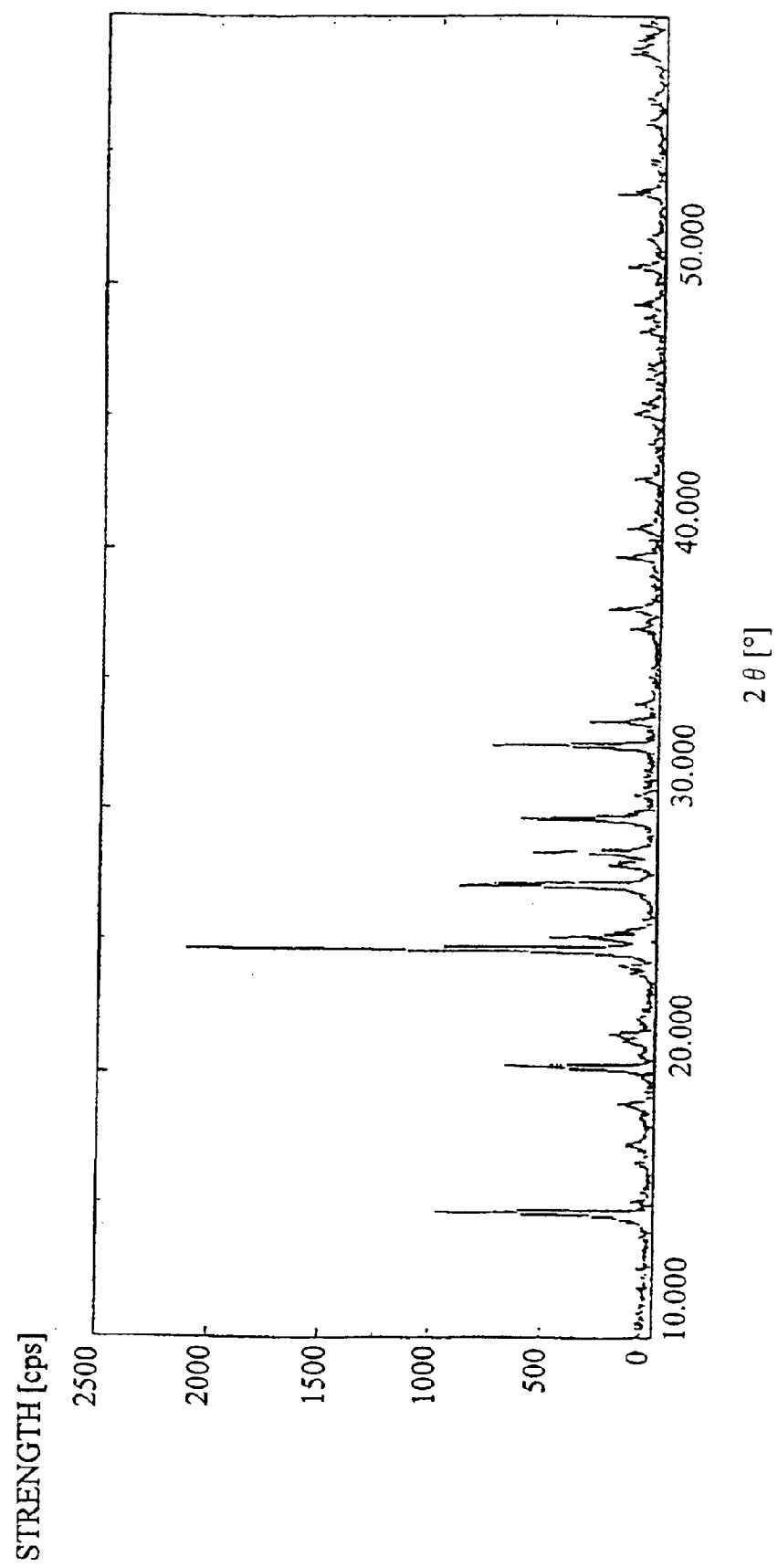
FIG. 3 is an X-ray diffraction pattern of a mixed vanadium compound of the vanadium sulfate (III) and vanadyl sulfate (IV) obtained in a producing example 2.

Vanadium pentoxide in the market ($V_2O_5$ purity: not less than 99%) of 18.4 g, sulfur of 3.2 g and concentrated sulfuric acid of 31 g were mixed for about 10 minutes into a paste form. The paste-formed mixture was calcined in an electric oven at 300° C. for 1 hours. The calcined matter (sample C) showed yellow-green color and its weight was 36.2 g. When the sample C was analyzed by the X-ray diffraction and the potential difference titrate method, a mixture of vanadium sulfate (III) ($V_2(SO_4)_3$) and vanadyl sulfate (IV) ($VOSO_4$) which contains $V^{3+}$ of 0.103 mol and $V^{4+}$ of 0.097 mol was confirmed. Quality levels of the sample C are shown in Table 1, and the X-ray diffraction pattern is shown in FIG. 3.

Embodiment 2

Figure 4:
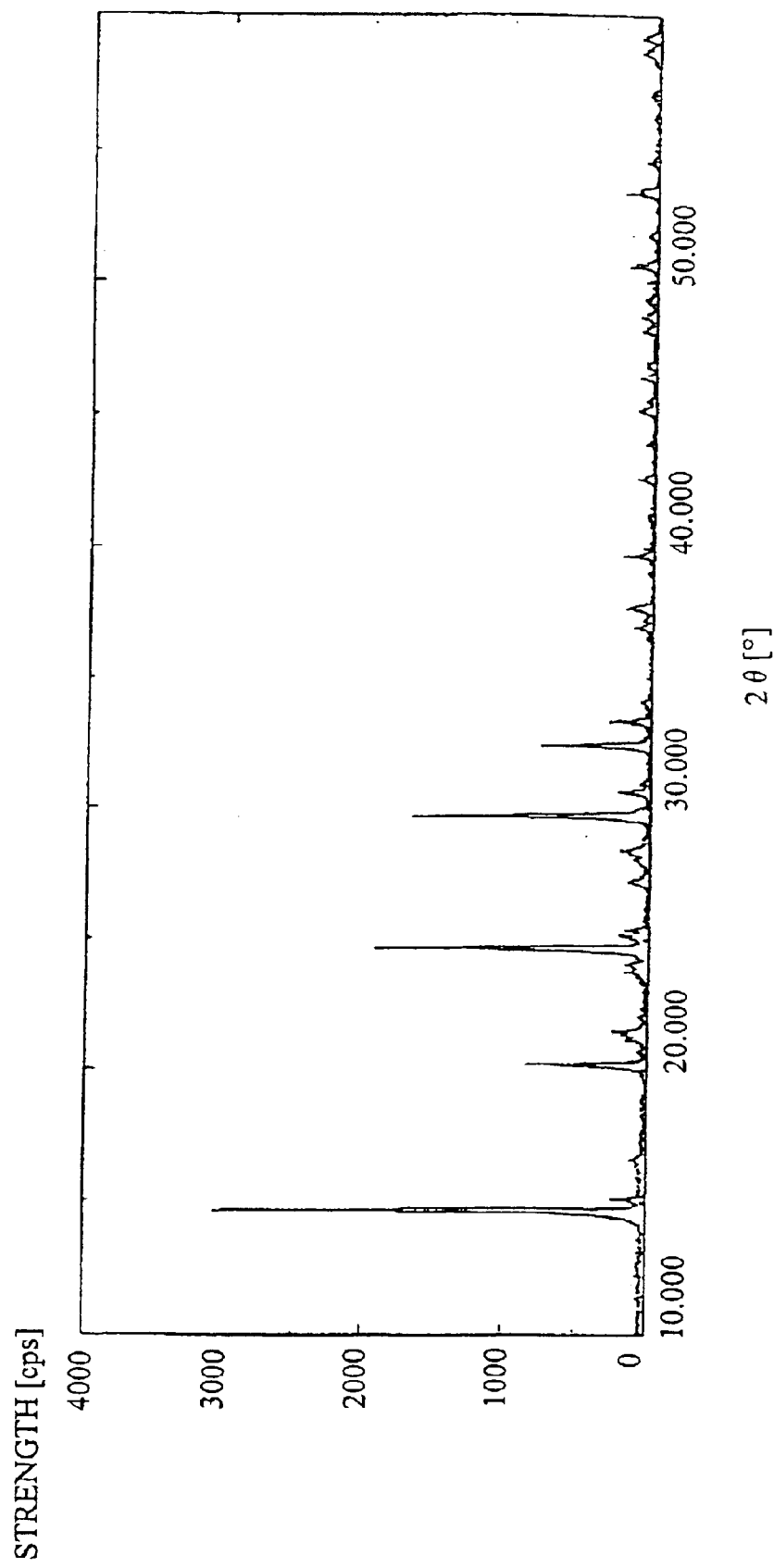
FIG. 4 is an X-ray diffraction pattern of a modified vanadium compound obtained in an embodiment 2.

Concentrated sulfuric acid of 15 g and water of 60 ml were added to the sample C obtained in the production example 2 (a mixture of vanadium sulfate(III) ($V_2(SO_4)_3$) and vanadyl sulfate (IV) ($VOSO_4$) of 36.2 g), and they were thermally dissolved at 100° C. for 3 hours to be concentrated, were cooled to room temperature, and were solidified and ground so that a modified vanadium compound (sample D) containing hydrate of vanadium sulfate $V_2(SO_4)_3$ and hydrate of vanadyl sulfate $VOSO4$ was obtained. The sample D had a blue-green color and its weight was 76.1 g. The quality levels of the sample D are shown in Table 1, and the X-ray diffraction pattern is shown in FIG. 4. Moreover, an amount of excessive $SO_4$ other than sulfate group composing $V_2(SO_4)_3$ and $VOSO4$ was calculated from the molar ratio of $V^{3+}$ and $V^{4+}$ in the sample C and the quality levels of the sample D. The results are shown in Table 2.

The sample D of 38 g (particle diameter: 1 mm) was added to water of 50 ml with various temperature, and time required for dissolving was measured. The results are shown in Table 3.

Embodiment 3

A vanadium sulfate electrolyte in the market ($V_2(SO_4)_3$: 2 mol/L, $H_2SO_4$: 1 mol/L) of 200 ml was used and was thermally heated and condensed at 100° C. for 3 hours so as to be reduced to about 80 ml. After the electrolyte was cooled to room temperature, it was ground so that a modified vanadium compound sample (sample E) of 156 g which has a green color and contains hydrate of vanadium sulfate $V_2(SO_4)_3$ was obtained. The quality levels of the sample E are shown in Table 1. Moreover, an amount of excessive $SO_4$ other than sulfate group composing $V_2(SO_4)_3$ was calculated from the quality levels. The results are shown in Table 2.

The sample E of 39 g (particle diameter: 1 mm) was added to water of 50 ml with various temperature, and time required for dissolving was measured. The results are shown in Table 3.

Embodiment 4

A vanadium sulfate electrolyte in the market ($V_2(SO_4)_3$: 2 mol/L, $H_2SO_4$: 1 mol/L) of 100 ml and a vanadyl sulfate electrolyte ($VOSO_4$: 2 mol/L, $H_2SO_4$: 2 mol/L) of 100 ml were mixed so that an electrolyte in which the mol of $V^{3+}$ and mol of $V^{4+}$ are equal was prepared. The prepared electrolyte was thermally heated and condensed at 100° C. for 3 hours so as to be reduced to about 75 ml. After the electrolyte was cooled to room temperature, it was ground so that a modified vanadium compound sample (sample F) which has a green-blue color and contains hydrate of vanadium sulfate $V_2(SO_4)_3$ and hydrate of vanadyl sulfate $VOSO_4$ was obtained. Weight of the sample F was 152 g. The quality levels of the sample F are shown in Table 1. Moreover, an amount of excessive $SO_4$ other than sulfate group composing $V_2(SO_4)_3$ and $VOSO_4$ was calculated from that molar ratio of $V^{3+}$ to $V^{4+}$ is 1:1 and from the quality levels of the sample F. The results are shown in Table 2.

The sample F of 38 g (particle diameter: 1 mm) was added to water of 50 ml with various temperature, and time required for dissolving was measured. The results are shown in Table 3.

COMPARARTIVE EXAMPLE 1

Vanadium pentoxide ($V_2O_5$) obtained from orimulsion ash of 19.4 g, sulfur of 4.2 g and concentrated sulfuric acid of 39 g were mixed for about 10 minutes into a paste form. The paste-formed mixture was calcined in an electric oven at 300° C. for 2 hours. The calcined matter after cooling (sample G) showed lemon-yellow color and its weight was 42.0 g. When the sample G was subject to the X-ray diffraction, vanadium sulfate (III) ($V_2(SO_4)_3$) was confirmed. Quality levels of the sample G are shown in Table 1.

Powder of the sample G of 21 g (particle diameter: 0.15 mm) and concentrated sulfuric acid of 5 g were added to water of 50 ml with various temperature, and time required for dissolving was measured. The results are shown in Table 3.

COMPARATIVE EXAMPLE 2

Vanadium pentoxide in the market ($V_2O_5$ purity: not less than 99%) of 18.4 g, sulfur of 3.2 g and concentrated sulfuric acid of 31 g were mixed for about 10 minutes into a paste form. The paste-formed mixture was calcined in an electric oven at 300° C. for 1 hours. The calcined matter (sample H) showed yellow-green color and its weight was 37.0 g. When the sample H was analyzed by the X-ray diffraction and the potential difference titrate method, a mixture of vanadium sulfate (III) ($V_2(SO_4)_3$) and vanadyl sulfate (IV) ($VOSO_4$) which contains $V^{3+}$ of 0.105 mol and $V^{4+}$ of 0.095 mol was confirmed. Quality levels of the sample H are shown in Table 1.

The sample H of 18.5 g (particle diameter: 0.15 mm) and concentrated sulfuric acid of 7.5 g were added to water of 50 ml with various temperature, and time required for dissolving was measured. The results are shown in Table 3.

Embodiment 5
<Production of Electrolyte and Measurement of Charging/Discharging Property>

Powder of 712 g of the sample B obtained in Embodiment 1 (the modified vanadium compound in which vanadium sulfate (III) was modified by sulfuric acid) which has a particle diameter of 1 mm was dissolved in water of 680 ml at 30° C. for 10 minutes, a negative electrode electrolyte, in which density of trivalent vanadium ion is 2 mol/l and density of sulfate ion is 4 mol/l, was obtained. Moreover, the sample B and vanadium pentoxide were mixed and were agitated to be reacted in water at 60° C. for 1 hour, and a solution, in which density of tetravalent vanadium ion is 2 mol/l and density of sulfate ion is 4 mol/l, was prepared to be a positive electrode electrolyte. These positive and negative electrode electrolytes were used so that a small battery of the following specifications were installed, and the charging/discharging properties was checked. The results are shown in Table 4.

Specification of Small Battery
Electrode area: 500 cm$^2$
Electrode: carbon fiber cloth
Diaphragm: anion exchange film
Bipolar plate: carbon plate
Material of tank and piping: rigid PVC
Tank capacity: 5 lit. for both positive electrode electrolyte and negative electrode electrolyte Embodiment 6

Powder of 761 g of the sample D obtained in Embodiment 2 (the modified vanadium compound in which vanadium sulfate (III) and vanadyl sulfate (IV) were modified by sulfuric acid) which has a particle diameter of 1 mm was dissolved in water of 620 ml at 30° C. for 10 minutes, a solution in which density of vanadium ion is 2 mol/l and density of sulfate ion is 4 mol/l was prepared. This solution was used directly as a negative electrode electrolyte and a positive electrode electrolyte.

These prepared positive and negative electrode electrolytes were used so that a redox flow battery of the same specifications as embodiment 5 was installed, and the charging/discharging properties were checked. The results are shown in Table 4.

TABLE 4

|  | Embodiment 5 | Embodiment 6 |
|---|---|---|
| Electric current efficiency (%) | 99.5 | 99.6 |
| Voltage efficiency (%) | 85.1 | 85.9 |
| Energy efficiency (%) | 84.7 | 85.5 |
| Battery capacity (WH) | 120 | 120 |

INDUSTRIAL APPLICABILITY

The modified vanadium compound of the present invention is obtained in such a manner that vanadium sulfate (III) or mixed vanadium compound of vanadium sulfate (III) and vanadyl sulfate (IV) is modified by sulfuric acid. It has excellent solubility with water, and enables preparation of a redox flow battery electrolyte for a shorter time than a conventional material. Moreover, since the compound which contains trivalent vanadium component or both of trivalent and tetravalent vanadium components and a sulfuric acid component which are required for an electrolyte of a redox flow battery, a redox flow battery electrolyte can be prepared only by dissolving a predetermined amount of the compound in water. Further, according to the modified vanadium compound producing method of the present invention, the modified vanadium compound of the present invention can be prepared easily.

We claim:

1. A solidified, modified vanadium compound, characterized in that vanadium sulfate (III) or a mixed vanadium compound of vanadium sulfate (III) and vanadyl sulfate (IV) contains excessive sulfuric acid other than the sulfate group composing the vanadium sulfate (III) or the vanadyl sulfate (IV) in an amount of 10 to 30 weight %.

2. The solidified, modified vanadium compound according to claim 1, characterized in that the form of the modified vanadium compound is particle, and the excessive sulfuric acid is held on surfaces or insides of the particles.

3. The solidified, modified vanadium compound according to claim 2, characterized in that the average particle diameter is not more than 30 mm.

4. The solidified, modified vanadium compound according to claim 1, characterized in that the molar ratio ($V^{4+}/V^{3+}$) of tetravalent vanadium atoms to trivalent vanadium atoms in the mixed vanadium compound is within the range of 0.65 to 1.5.

5. The solidified, modified vanadium compound according to claim 1, characterized in that the molar ratio ($V^{4+}/V^{3+}$) of tetravalent vanadium atoms to trivalent vanadium atoms in the mixed vanadium compound is within the range of 0.95 to 1.05.

6. A solidified, modified vanadium compound producing method, characterized in that a vanadium-containing solution, in which vanadium sulfate (III), or a mixed vanadium compound of vanadium sulfate (III) and vanadyl sulfate (IV), is dissolved in a sulfate solution, is condensed, and cooled to be solidified wherein said solidified, modified vanadium compound contains excessive sulfuric acid other than the sulfate group composing the vanadium sulfate (III) or the vanadyl sulfate (IV) in an amount of 10 to 30 weight %.

7. A solidified, modified vanadium compound producing method, characterized in that vanadium sulfate (III), or a mixed vanadium compound of vanadium sulfate (III) and vanadyl sulfate (IV), is dissolved in a sulfate solution, and the obtained vanadium-containing solution is condensed and is cooled to be solidified wherein said solidified, modified vanadium compound contains excessive sulfuric acid other than the sulfate group composing the vanadium sulfate (III) or the vanadyl sulfate (IV) in an amount of 10 to 30 weight %.

* * * * *